June 4, 1968          C. E. ADAMS          3,386,457

SERVOVALVE HAVING FLOATING RING PILOT STAGE

Filed March 10, 1966          2 Sheets-Sheet 1

INVENTOR.
Cecil E. Adams
BY Wood, Herron & Evans
ATTORNEYS

INVENTOR
Cecil E. Adams
BY Wood, Herron & Evans
ATTORNEYS

United States Patent Office 3,386,457
Patented June 4, 1968

3,386,457
SERVOVALVE HAVING FLOATING
RING PILOT STAGE
Cecil E. Adams, Columbus, Ohio, assignor to Abex
Corporation, a corporation of Delaware
Filed Mar. 10, 1966, Ser. No. 533,350
9 Claims. (Cl. 137—85)

ABSTRACT OF THE DISCLOSURE

A pilot operated servovalve wherein the pilot valve which controls the operating pressures for opposed operating pressure chambers of a spool type main valve is comprised of a port carrying member extending angularly from the spool and movable therewith, and an annular pilot valve encircling the ports of the port carrying member. The annular pilot valve is perpendicularly shiftable relative to the axis port carrying member by a pair of gears, one of which is an input and the other of which is a feedback.

---

This invention relates to a rotary pilot operated servovalve. The valve of this invention is provided for controlling a fluid motor to produce an output movement having a rate or angular extent proportioned to or following a rotary input applied to the pilot stage of the servovalve.

Such valves can be used, for example, to control a rotary fluid motor so that the motor will rotate at a speed which is equal to, or at some constant porportion to, the speed of an electric motor or other means operating a control shaft from which a rotary input is applied to the servovalve. The servovalve of this invention can also be used to control the flow of fluid to a lineal fluid motor to produce an output movement which is proportioned to an acute angular rotary input supplied to the servovalve through the turning of a control shaft through an arc or portion of a revolution. Such valves find application in shipboard use to control rudder movement, in aircraft to control flap movement, and in other applications requiring that a fluid motor respond proportionally to or follow the movement of a control which may be of small amplitude or force.

The present valve includes a first or pilot stage which controls movement of a second or main stage. The pilot stage includes an encircling or "floating" rotatable valve element which is moved relative to pilot port means in response to differences between the rotary movements or speeds of the control shaft and the controlled fluid motor, to establish a pressure differential corresponding to the difference in movements. This pressure differential is applied to a pressure operated spool valve in the main stage, the spool being shifted in accordance with the magnitude of the drop. Shifting of the main spool regulates the rate and direction of flow of pressure fluid to the controlled fluid motor, and is transferred to the pilot port means, shifting it within the encircling valve element and thereby tending to minimize the differential. Movement of the fluid motor by the flow directed to it is used to provide a rotary feedback movement to the encircling valve element restoring it to a null position when the output delivered by the fluid motor matches or follows the input applied to the control shaft.

More specifically, in the pilot stage of the valve the encircling rotatable valve element is preferably in the form of an annular ring loosely surrounding or "floating" around a lineally shiftable second valve element. The second valve element contains two passages leading to diametrically opposed outlet or pilot ports opening into the space or annulus between the second valve element and the surrounding ring-like rotatable valve element. Small volumes of pressure fluid are supplied through these passages to the pilot ports. The annular internal surface of the rotatable valve element forms valves with each of the two pilot ports, restricting the flow of fluid through each port more or less as the surface approaches or recedes from it. The pressures at these ports are reflected in opposed pressure chambers communicating with the main stage spool valve and act to position it.

The rotatable valve element is coupled mechanically both to the control shaft and to the controlled, output, or fluid motor shaft. Various forms of couplings may be used depending upon the type, rate, or magnitude of the control signal. Geared couplings may be used, with the control shaft geared to the rotatable valve element and the output shaft geared to the valve element at an opposite point on its periphery.

In the balanced or steady state condition, i.e. when the movement of the output shaft matches or follows that of the input shaft, the rotatable valve element rotates about the second valve element in centered position with respect to the two pilot ports so that the flows through the ports are restricted equally. In this condition equal opposed pressures are reflected in the pressure chambers and act equally on the main spool effecting no resultant movement in the second stage and no change in the flow to the fluid motor.

Rotational movement of the control shaft which is not balanced by equal movement of the output shaft displaces the rotatable valve element about the second valve element in opposite directions relative to the opposed pilot ports. Such movement brings the valve surface closer to one pilot port and farther from the other, thereby creating unequal restrictions on the flow from those ports and establishing a pressure differential at opposite ends of the main spool, moving the spool correspondingly.

The second valve element of the pilot stage, in which the two pilot ports are located, is mechanically coupled to the main spool and moves with it in a direction following the off-center displacement of the rotatable valve element. Movement of the fluid motor is fed back to the rotatable valve element through the output shaft and rotates it in the same direction as the control signal as the speed of the output shaft approaches that of the control shaft. Thus the feedback signal tends to recenter the rotatable valve element relative to the pilot ports, and the control pressures acting on the main spool are equalized when it arrives at a position at which the flow to the fluid motor produces movement thereof matching the input or control movement.

The invention can best be further described by reference to the accompanying drawings, in which.

Figure 1:
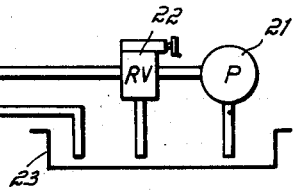
FIGURE 1 is a circuit diagram showing a hydraulic system incorporating a rotary servovalve in accordance with this invention.

In the hydraulic system shown for purposes of explanation in FIGURE 1, a rotary servovalve 10 is employed to correlate or synchronize the rotation of a rotary fluid motor 11 with the rotation of an electric motor 12 or other source of rotation which the motor 11 is to follow. Servovalve 10 shown in FIGURE 1 has five ports, designated as 15, 16, 17, 18, and 19. Fluid under pressure from a pump 21 or other source of pressure is supplied through a relief valve 22 to ports 15 and 19, these ports thus constituting pressure ports. Port 17 is connected to a fluid reservoir or tank 23, and ports 16 and 18 are connected to the operating ports 26 and 28 of fluid motor 11. It will be understood that the flow of pressure fluid from valve port 16 to motor port 26 will cause fluid motor 11 to rotate in one direction, while the supply of pressure fluid from valve port 18 to motor 28 will cause motor 11 to rotate in the opposite direction.

Figure 2:
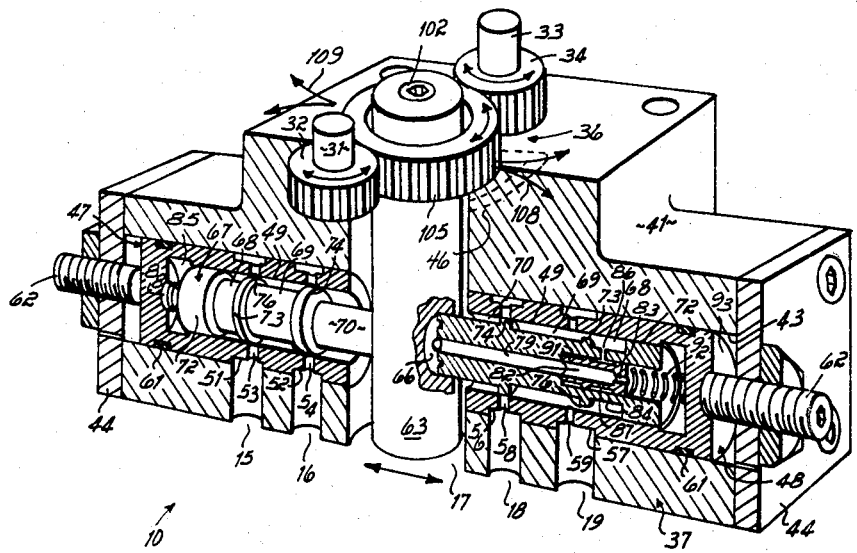
FIGURE 2 is a perspective cut-away view of a preferred form of servovalve suitable for use in the system shown in FIGURE 1.

Fluid motor 11 drives an output shaft 31 which is connected directly or through suitable gearing to a gear 32 located within servo valve 10, as shown in FIGURE 2. Electric motor 12 operates a shaft 33 which constitutes a control or input shaft. Shaft 33 is connected to a gear 34 which is spaced from gear 32.

Figure 3:
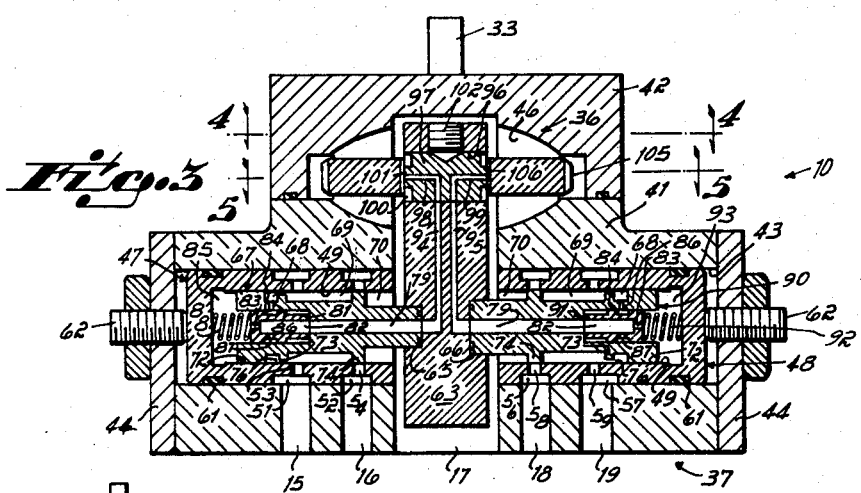
FIGURE 3 is a vertical axial section of the valve shown in FIGURE 2.

As shown in FIGURES 2 and 3, servo valve 10 has a first or pilot stage designated generally at 36, which includes the two gears 32 and 34, and it also includes a second or main stage designated generally at 37.

Valve 10 includes a main body or casting 41 and a head 42 which is secured to body 41 by suitable means not shown. The body 41 has an axial or longitudinal bore 43 which is closed by end plates 44, 44. This main bore 43 is intersected at axially spaced positions by the ports 15–19. It will be noted that tank port 17 intersects the main bore 43 at right angles end extends perpendicularly through body 41 from one side thereof to the other, opening into a chamber 46 defined between body 41 and head 42 in the pilot stage 36.

Hollow sleeves 47 and 48 which are closed at their outer ends are fitted sealingly in the left and right hand portions of bore 43 on either side of the centrally located tank port 17. These sleeves 47 and 48 each have an axial bore 49 opening to tank port 17 and extending toward but not through the outer ends of sleeves 47 and 48.

The left sleeve 47 has two circumferential axially spaced grooves 51 and 52 which communicate with the sleeve bore 49 through radial ports 53 and 54 respectively. Sleeve 47 is positioned axially in bore 43 so that grooves 51 and 52 communicate with body ports 15 and 16 respectively. The right sleeve 48 has a pair of axially spaced circumferential grooves 56 and 57 which communicate with body ports 18 and 19 respectively and which communicate with internal bore 49 through radial ports 58 and 59 respectively. The two sleeves 47 and 48 are sealed to the bore 43 by suitable O-ring means 61, 61, and are adjustably positioned in the bore 43 by opposed endwise stops 62, 62.

A lineally shiftable, non-rotating, valve element 63 is movable from side to side in port 17 and is of generally cylindrical form having an axis which extends perpendicularly to the axis of bore 43. The lower portion of valve element 63 extends between sleeves 47 and 48 but does not contact either. Valve element 63 has a pair of opposed flat-bottomed bores 65 and 66 facing the bores 49, 49 of sleeves 47 and 48 respectively. As will be described this valve element 63 cooperates with a rotary valve element in the pilot stage.

A movable spool valve element 67 is slidable in bore 49 of the left sleeve 47. This left spool 67 has three circumferential grooves 68, 69 and 70 which separate lands 72, 73 and 74. From FIGURE 3 it can be seen that lands 72 and 74 form seals with bore 49, and that the axial width of land 74 is just equal to the width of port 54. The diameter of land 73 is somewhat smaller (eg. .005″) than the diameter of bore 49; hence land 73 does not form a seal with the sleeve but rather defines an annular restriction or orifice 76, the purpose of which will be explained. Left spool 67 has a stepped axial bore 79, and a plug 81 is press-fitted into the larger diameter left end portion of the bore 79. The plug 81 has an axial bore 82 which opens into spool bore 79 and which also communicates with a small diameter orifice or restrictor 83 leading to a left pressure chamber 85.

Plug 81 has a circumferential groove 84 which communicates with a radial restrictor 86 in spool 67 opening into groove 68 thereof. Communication between groove 84 of plug 81 and the internal bore 82 thereof is provided by a restricted port 87. A spring 88 in chamber 85 engages the end of plug 81 and constantly urges spool 67 into endwise facial contact with the flat bottom of bore 65 in the valve element 63.

The opposite or right hand sleeve 48 may be identical in structure to sleeve 47, and it contains a spool valve element 90 which may be identical to the left spool 67. A plug 91 is engaged in the right end of spool 90 and a spring 92 urges plug 91 and spool 90 into endwise facial engagement with the flat-bottom of the bore 66 of valve element 63. The right ends of spool 90 and plug 91 are exposed to pressure in a right pressure chamber 93. Together these two elements 67 and 90 define what can be considered a main spool, inasmuch as they move together with element 63 as a unit at all times. Spool 90 and plug 91 contain grooves, lands, ports, and so on corresponding exactly to those of left spool 67 and bear the same number as the corresponding feature in the left hand spool and plug.

Figure 4:
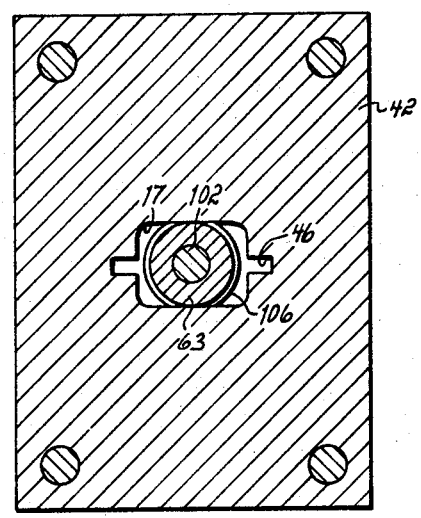
FIGURE 4 is a view in section, the section being taken on line 4—4 of FIGURE 3.

As indicated in FIGURE 4, the post-like valve element 63 is shiftable only to the left and right in the slot-like port 17 as the main spool comprised of elements 67 and 90 shifts. It contains two passageways 94 and 95 which communicate with bores 79, 79 in spools 67 and 90 respectively.

The upper end of valve element 63 extends into chamber 46 as shown in FIGURE 3. This upper end portion of element 63 has a cross-bore 96 which receives an insert 97. Insert 97 has outlet passages leading to pilot ports 98 and 99 which open to the surface of insert 97 at positions spaced 180° apart, and which communicate respectively with passages 94 and 95. Insert 97 is relieved as as 100 to define relatively raised lands 101, 101 around ports 98 and 99. A set screw 102 secures insert 97 in bore 96.

A ring gear 105 is freely rotatable on valve member 63, and has peripheral gear teeth which are engaged by gears 32 and 34 in chamber 46. Ring gear 105 is annular or ring-like in shape, having an inner valve surface 106 surrounding ports 98 and 99 and forming valves with each of them. The inside diameter of ring gear 105 should be slightly larger than the outside diameter of valve element 63 at ports 98 and 99, so that it "floats" around element 63 in the horizontal plane. Together, ring gear 105 and element 63 define two similar pilot valves in the pilot stage. The ring gear is sometimes referred to hereinafter as the rotatable valve element and element 63 is occasionally referred to as the shiftable valve element.

In the operation of servo valve 10, with reference to the system shown in FIGURE 1, when electirc motor 12 applies an input signal which rotates gear 34, this rotation is transmitted to ring gear 105. If the fluid motor 11 is stopped or, more generally, if gear 32 is rotating at a speed less than that of gear 34, the greater rotational movement from gear 34 on one side of gear 105 will displace that valve element from its null or centered position on the valve element 63, moving surface 106 relative to ports 98 and 99. For example, referring to FIGURE 2, if input gear 34 is rotating in the counterclockwise direction more rapidly than gear 32, ring gear 105 will be displaced to the right in the direction indicated by arrow 108. As ring gear 105 moves to the right, opposite points on its inner surface 106 move relatively toward port 98 and away from port 99. Fluid is constantly being supplied from the pump to both of these ports via ports 15 and 19, grooves 51 and 57, ports 53 and 59, grooves 69, 69, orifices 76, 76, grooves 68, 68, restrictors 86, 86, grooves 84, 84, restrictors 87, 87, bores 82, 82, and 79, 79, and passages 94 and 95, respectively. Hence such movement of the ring gear 105 increases the pressure in passage 94 and decreases that in passage 95.

The increased pressure in passage 94 is reflected backwardly through restrictor 83 to the chamber 85 at the left end of spool 67, while the reduced pressure in passage 95 is reflected in chamber 93, so that a net force to the right acts on spool 67. Spool 67 thereupon moves to the right, displacing valve element 63 to the right and pushing the spool 90 to the right. Movement of the main spool to the right will continue until the limits of motion are reached or until element 63 is recentered within surface 106 or until the pressure on the ends of the main spool are balanced.

Movement to the right of land 74 of spool 67 from its null position opens a path of communication between pressure port 15 and port 16, while movement of land 74 of spool 90 opens a path of communication between port 18 and tank port 17. Thus, pressure fluid from port 15 is applied to fluid motor 11 at port 26, and fluid flowing through motor 11 from port 26 to port 28 causes the motor to rotate shaft 31 more rapidly in the counterclockwise direction. Generally speaking, within the limits of movement of valve members 63, 105, the greater the difference in speeds between the two shafts 33 and 31, the greater the differential between the pressures at ports 98 and 99, and the greater or lesser the flow of fluid that will be applied to the fluid motor tending to accelerate or decelerate it to match the speed of the electric motor. Where temporary large differentials in speeds between the motors 11 and 12 are expected or motor stalling may occur, it may be useful to include a one way clutch or other override means between the motors 11 and 12 and the shafts 31 and 33.

As the fluid motor 11 accelerates and the peripheral speed of gear 32 approaches the peripheral speed of gear 34, the ring gear 105 is gradually centered on valve element 63. As this occurs the pressures in ports 98 and 99 become equalized, and ultimately when the speeds are equalized no net force acts on the main spool and it stops moving until another change in gear speeds occurs.

If for any reason the fluid motor tends to override the electric motor, or if the control speed is reduced, ring gear 105 will be displaced in the opposite direction, e.g. in the direction of arrow 109 in FIGURE 2, thereby establishing a higher pressure in port 99 than in port 98, displacing the main spool to the left and decreasing the volume of fluid going to the fluid motor until the speed has equalized.

From the foregoing it will be seen that the first stage 36 of the valve 10 acts as a speed differential responsive pilot valve which actuates the main valve section 37 to adjust the fluid flow to motor 11 to minimize the speed differential between gears 32 and 34.

The restrictors 83, 83 through which flow communicates between the left and right pressure chambers 85 and 93 and their respective bores 79, 79 act as movement stabilizers and restrain excessively rapid movement of the main spool.

It will also be noted that flow from the pressure port 15 or 19 to passages 98 or 99 passes through a number of restrictors connected in series, these being restrictors 76, 86, and 87, which reduce the pilot flow through ports 98 and 99 to a very small quantity, and which also effect gradual movement of the main spool. The use of two or more restrictors in series is preferred for this purpose since use of a plurality of restrictors to effect the desired pressure drop permits each restrictor to be relatively larger than if a single restrictor were used to produce the entire pressure drop. This reduces the danger of restrictor clogging by grit or dirt particles entrained in the oil.

The opposed stops 62, 62 enable a null adjustment to be made by shifting spool sleeves 47 and 48 until a minimum flow through the pilot stage occurs at balanced speed conditions between the electric motor and the fluid motor.

The embodiment of the invention described with reference to FIGURES 1 through 4 can be used to couple the operation of a fluid motor to the operation of an electric motor. It will be appreciated that the actual speed of the fluid motor can be faster than or slower than the speed of the electric motor by using step-up or step-down gearing to shaft 31 or 33 to compensate.

The invention can also be used to provide an angular or lineal positional output in response to a discontinuous or short angular input. In other words, an input signal comprising rotation of a shaft through an arc of 10°, for example, can be used to cause a lineal fluid motor to move a ram through a proportional distance. This embodiment of the invention is shown in FIGURE 6.

Figure 6:
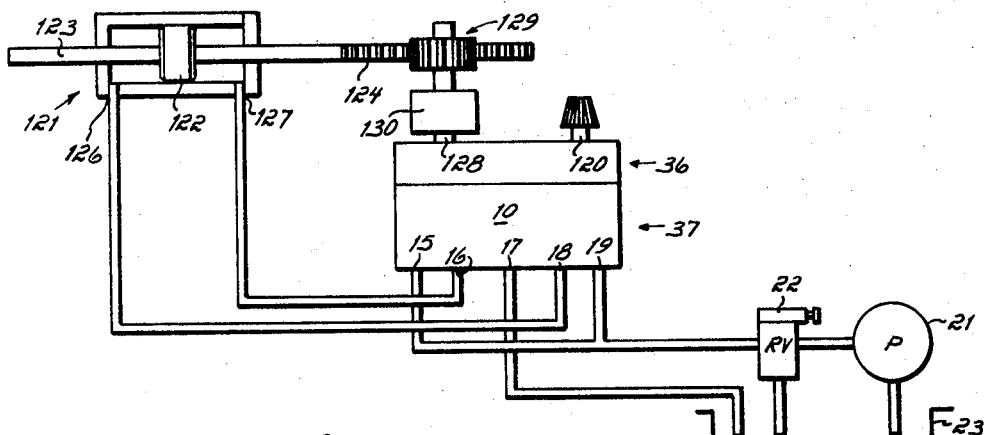
FIGURE 6 is a circuit diagram of a hydraulic system incorporating a servo valve in accordance with this invention which controls a hydraulic ram to provide a linear positional output.

In the system shown in FIGURE 6, valve 10 responds to an angular input supplied to it through a control shaft 120 which may be manually operated or positioned to provide a corresponding proportional lineal output movement of a fluid motor 121. Motor 121 includes a piston 122 which operates a ram 123 and a control arm 124. Motor 121 has two ports 126 and 127 which are connected to valve ports 18 and 16 respectively. Arm 124 turns feedback shaft 128 to which it is connected through a rack and pinion arrangement 129 and a gear reduction device 130. Control shaft 120 is suitably connected to the gear 34 while feedback shaft 128 is connected to the gear 32.

Figure 5:
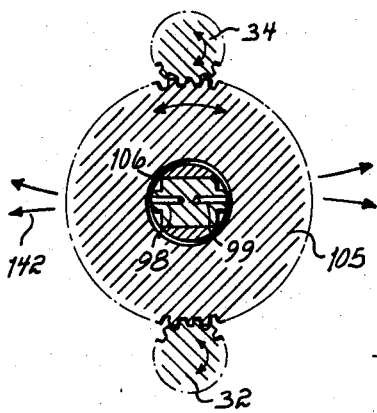
FIGURE 5 is a horizontal section taken on line 5—5 of FIGURE 3.

If control shaft 120 is rotated clockwise say, 10°, the rotation tends to pivot the valve element 105 upon the gear 32 in the direction indicated by arrow 142 (FIG. 5). As that occurs, the flow path through valve 99, 106 is reduced and the flow path through valve 98, 106 is opened, so that a pressure differential is created at opposite ends of the main spool. This pressure differential shifts the spool to direct a greater flow to motor 121, to move piston 122 in a direction rotating shaft 128 in the direction recentering rotatable valve element 105 with respect to the ports 98 and 99 so that the pressures acting on the main spool are equalized. It will be understood that by use of suitable step-down gearings, relatively large angular rotations of the control can be reduced to angular displacements of a fraction of a complete revolution, so that the operating range of rotation of the input or output shaft is not exceeded.

While I have described a preferred embodiment of my invention, those skilled in the art will appreciate that the invention is not limited to the precise form illustrated, and that it includes other modifications and embodiments within the meaning of the following claims:

I claim:
1. A valve comprising,
    a body having a bore,
    a spool movable axially in said bore to regulate fluid flow between spaced ports entering said bore,
    opposed pressure chambers in said bore unequal pressures in which tend to move said spool in said bore,
    pilot valve means for establishing a differential between the pressures acting in said pressure chambers,
    said pilot valve means including a shiftable valve member presenting a pair of opposed pilot ports and a valve member loosely encircling and rotatable around said shiftable valve member, said encircling valve member presenting surfaces forming variable pilot valves with the respective pilot ports,
    said shiftable valve member being connected to and extending angularly from said spool, said shiftable valve member shifting positionally within said encircling valve member when said spool moves axially in said bore,
    passage means for applying pressure fluid to the respective pilot ports and for reflecting in the respective pressure chambers pressures established by said pilot valves, control means and feedback means each coupled to said encircling valve member for rotating the same around the axis of said shiftable valve member, said control means and feedback means being coupled to said encircling valve member at opposed positions thereon angularly displaced from a line drawn between said pilot ports.

2. The valve of claim 1 wherein said spool includes two axially aligned sections, and further wherein said shiftable valve member is fitted between said sections and extends at right angles to the axis of said spool.

3. The valve of claim 2 wherein said pilot ports are formed adjacent an end of said shiftable valve member spaced from said spool and extending into said encircling valve member.

4. The valve of claim 2 wherein an endwise portion of each said spool section is received in a socket formed in said shiftable valve member.

5. The valve of claim 1 wherein said pilot ports communicate with said chambers through passages formed in said shiftable valve member and in said spool, said passages including flow restricting means.

6. The valve of claim 5 wherein said pressure fluid is applied to said passages from said bore through said spool.

7. The valve of claim 5 wherein said flow restricting means comprise a plurality of flow restricting orifices in series flow relation.

8. A two-stage rotary servovalve comprising, a body having a bore, a spool movable in said bore to control fluid flow between spaced ports entering said bore, pressure chambers communicating with opposed control surfaces presented by said spool unequal pressures on which tend to move said spool in said bore to change the flow between said ports, valve means for establishing a pressure differential between said pressure chambers, said valve means including means connected to move with said spool presenting a pair of pilot ports, and surface means forming a valve with each said pilot port, said surface means being both rotatable about the axis of said pilot port presenting means and shiftable in a direction perpendicular to said axis;

passage means for applying pressure fluid to said pilot ports, the flow of said fluid from said pilot ports through said valves establishing a pressure drop across each said valve varying with the proximity of said surface means to the respective pilot port, means applying pressures upstream of said pilot ports to the respective pressure chambers, a control shaft and a feedback shaft each rotationally coupled to said surface means for rotating said surface means about the axis of said means presenting said pilot ports, said shafts being coupled to said surface means to displace the latter unequally between said ports in response to unequal rotations of said shafts.

9. Valve apparatus comprising, a post-like first member having two separate internal passages therein leading to two ports at diametrically opposite positions on the lateral surface of said member, a ring-like second member having a cylindrical opening therethrough loosely surrounding said ports in said lateral surface, the diameter of said opening being sufficiently greater than the diameter of said surface, that flow through one of said ports is increasingly restricted and flow through the other of said ports is less restricted as said second member is moved radially with respect to the ports of said first member, a piston valve element slidable in a bore to regulate flow through said bore, said piston valve element having opposed control surfaces with which the respective passages leading to said ports communicate, means for supplying pressure fluid into said passages, said first member being rigidly connected at a right angle to the axis of said piston valve element between the ends thereof for movement within said opening as said piston valve element moves axially in said bore, said ports being formed on a line parallel to the axis of said bore.

control means for imparting peripheral movement to said ring-like second member to rotate the same about the axis of said first member, said control means being connected to said second member at a point displaced angularly from said ports, and feedback means for imparting peripheral movement to said second member at a diametrically opposite point thereon.

References Cited

UNITED STATES PATENTS 2,737,929   3/1956   Adams _____ 91—381 X
3,065,145  11/1962  Molander _____ 137—625.64 X ALAN COHAN, *Primary Examiner.*